United States Patent [19]

Sato

[11] 4,125,074
[45] Nov. 14, 1978

[54] FEED MECHANISM FOR PORTABLE LABELING MACHINE

[75] Inventor: Yo Sato, Tokyo, Japan

[73] Assignee: Kabushiki Kaisha Sato Kenkyusho, Tokyo, Japan

[21] Appl. No.: 785,357

[22] Filed: Apr. 7, 1977

[30] Foreign Application Priority Data

May 4, 1976 [JP] Japan ............................ 51/056531[U]

[51] Int. Cl.² ............................................ B41F 13/04
[52] U.S. Cl. ................................. 101/288; 101/228; 188/82.7; 226/157; 74/577 SF
[58] Field of Search ............... 226/157; 74/575, 577 S, 74/577 SF, 577 M; 188/82.7, 82.74, 82.77; 101/316, 288, 287, 228; 197/6.7

[56] References Cited

U.S. PATENT DOCUMENTS

| 696,642 | 4/1902 | Kinney | 74/577 M |
|---|---|---|---|
| 3,481,211 | 12/1969 | Bottazzi | 197/6.7 |
| 3,606,125 | 9/1971 | Tucker et al. | 226/157 |
| 3,636,782 | 1/1972 | Huber | 74/577 M |
| 3,678,780 | 7/1972 | Ponting | 74/577 SF |
| 3,798,106 | 3/1974 | Jenkins et al. | 101/316 |
| 3,860,108 | 1/1975 | Farfaglia | 188/82.7 |
| 3,923,582 | 12/1975 | Schroter et al. | 156/384 |
| 3,985,212 | 10/1976 | Gershnow et al. | 188/82.7 |

FOREIGN PATENT DOCUMENTS

| 230,208 | 11/1963 | Austria | 188/82.77 |
|---|---|---|---|
| 827,800 | 5/1938 | France | 226/157 |

*Primary Examiner*—William Pieprz
*Attorney, Agent, or Firm*—Ostrolenk, Faber, Gerb & Soffen

[57] ABSTRACT

A label strip feed mechanism for a portable labeling machine: a rotatable feed wheel having label strip feed projections on its outer periphery; one longitudinal end of the feed wheel is a toothed ratchet wheel; the other end of the feed wheel has a sleeve defining a recess, and inner retaining recesses inside the sleeve; a pawl member is rotatable coaxially with the feed wheel and is removably engageable with the ratchet wheel; a non-return member is stationary relative to the labeling machine and is removably engageable with the inner retaining recesses of the sleeve to prevent reverse rotation of the feed wheel; a manually actuated lever rotates the pawl to intermittently rotate the feed wheel.

14 Claims, 8 Drawing Figures

FEED MECHANISM FOR PORTABLE LABELING MACHINE

BACKGROUND OF THE INVENTION

1. Field of the Invention

The present invention relates to a portable labeling machine and more particularly to a feed mechanism for use in the portable labeling machine for preventing a continuous label strip from clogging or jamming in the machine.

2. Description of the Prior Art

In one known feed mechanism for a conventional labeling machine, a feed wheel for feeding the continuous label strip includes an open round pocket that is internally ratcheted. There is a first pawl which is engageable with the ratchet teeth of the feed wheel. The first pawl is connected by a protrusion to a member which is made coactive with a trigger, so that the pawl is rocked back and forth by squeezing and releasing of the trigger. The rocking motion of the first pawl intermittently rotates the feed wheel. To prevent reverse rotation of the feed wheel, the trigger has a series of indentations with which a second pawl, having a head portion and a tail portion, is brought into and out of engagement.

It is possible that both the first pawl acting as a feed member of the feed wheel and also the protrusion providing connection with the first pawl may be subjected to an excessive load due either to malfunction of the holding spool of the label strip or to clogging of the label strip. In the case of label clogging, the second pawl for preventing the reverse rotation of the feed wheel should be forcibly released from engagement with the indentations in the course of the squeezing of the trigger so as to remedy the label clogging. While it is in engagement with the indentations, the second pawl is subjected locally at its head edge to such high concentration of stress as to possibly break it.

SUMMARY OF THE INVENTION

It is, therefore, a major object of the present invention to provide a feed mechnism for use in a portable labeling machine which is free of the aforesaid drawbacks.

Another object of the present invention is to provide a feed mechanism of the above type, in which intermittent rotation of the feed wheel and prevention of reverse rotation of that wheel during its intermittent rotation can be insured, and particularly in which the parts of the machine will be free from breakage even as a result of an abruptly applied, perhaps large load.

A feed mechanism according to the present invention is used in a portable labeling machine, in which a continuous strip of labels is threaded in an indexed manner along a passageway and individual labels are imprinted with desired indicia in response to manual operation of an actuating member. The imprinted labels are separated from their backing strip and are applied to articles in consecutive manner in response to the manual operation.

The feed mechanism includes a rotatable feed wheel which is disposed so that its periphery forms a portion of the label strip passageway. The outer periphery of the feed wheel has a plurality of feed projections formed on it which are engageable with the perforations formed in the continuous label strip. The feed wheel extends longitudinally along its axis. At one longitudinal end, the feed wheel is formed into an integral ratchet wheel with outer drivable teeth. At the other longitudinal end, the feed wheel is in the form of a sleeve having an opening defined in it with an inner peripheral wall that is formed with retaining recesses. The feed mechanism further includes a pawl member which is rotatable coaxially with the feed wheel and is removably engageable with the ratchet wheel. The pawl member is manually actuated by the actuating member to intermittently rotate the feed wheel so as to effect feeding of a predetermined length of the continuous label strip. There is a non-return member which is stationary relative to the labeling machine and is removably engageable with cooperating retaining recesses in the sleeve of the feed wheel. The feed wheel is prevented from reverse rotation by its engagement with the non-return member. The spacing of the teeth of the ratchet wheel and of the recesses of the non-return member are selected so that the label strip advances only the length of one label for each actuation of the actuating lever.

BRIEF DESCRIPTION OF THE DRAWINGS

Other objects and features of the present invention will become apparent from the following description taken in conjunction with the accompanying drawings, in which.

DESCRIPTION OF A PREFERRED EMBODIMENT

Figure 1:
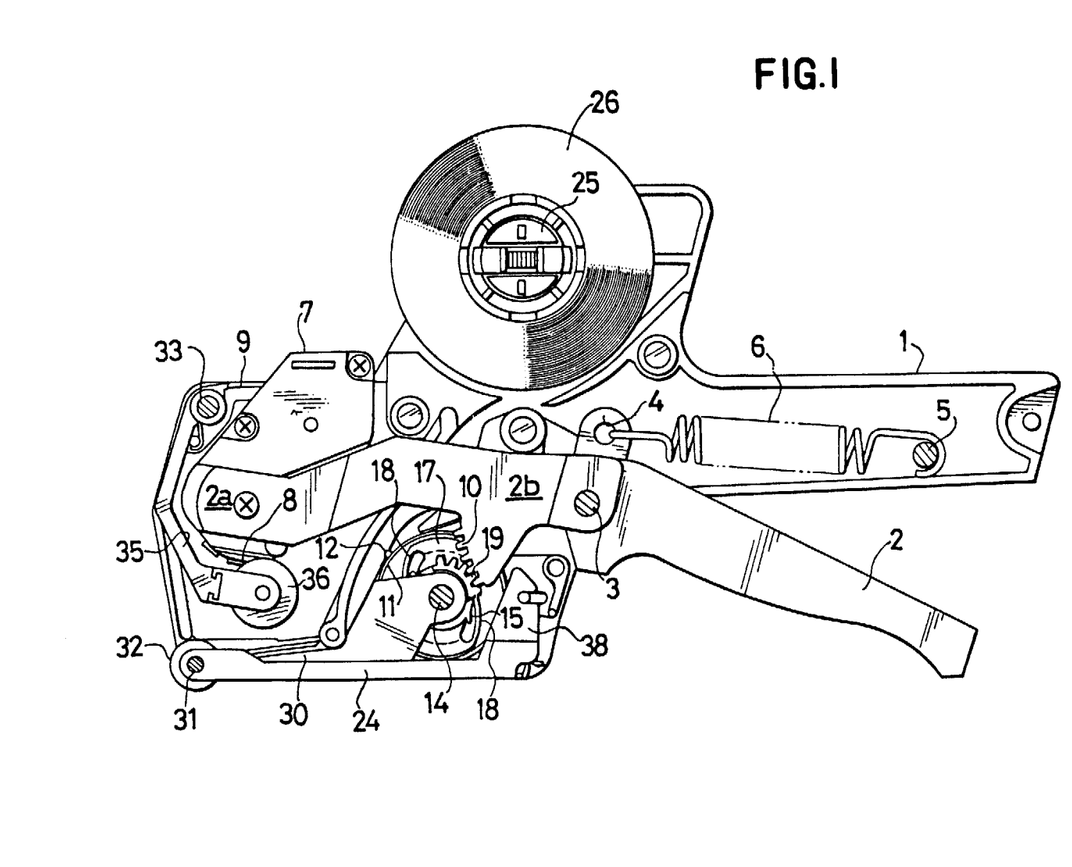
FIG. 1 is a side elevational view, with the near side plate removed, of a portable labeling machine which is equipped with a feed mechanism according to the present invention; with the hand lever released.
Figure 2:
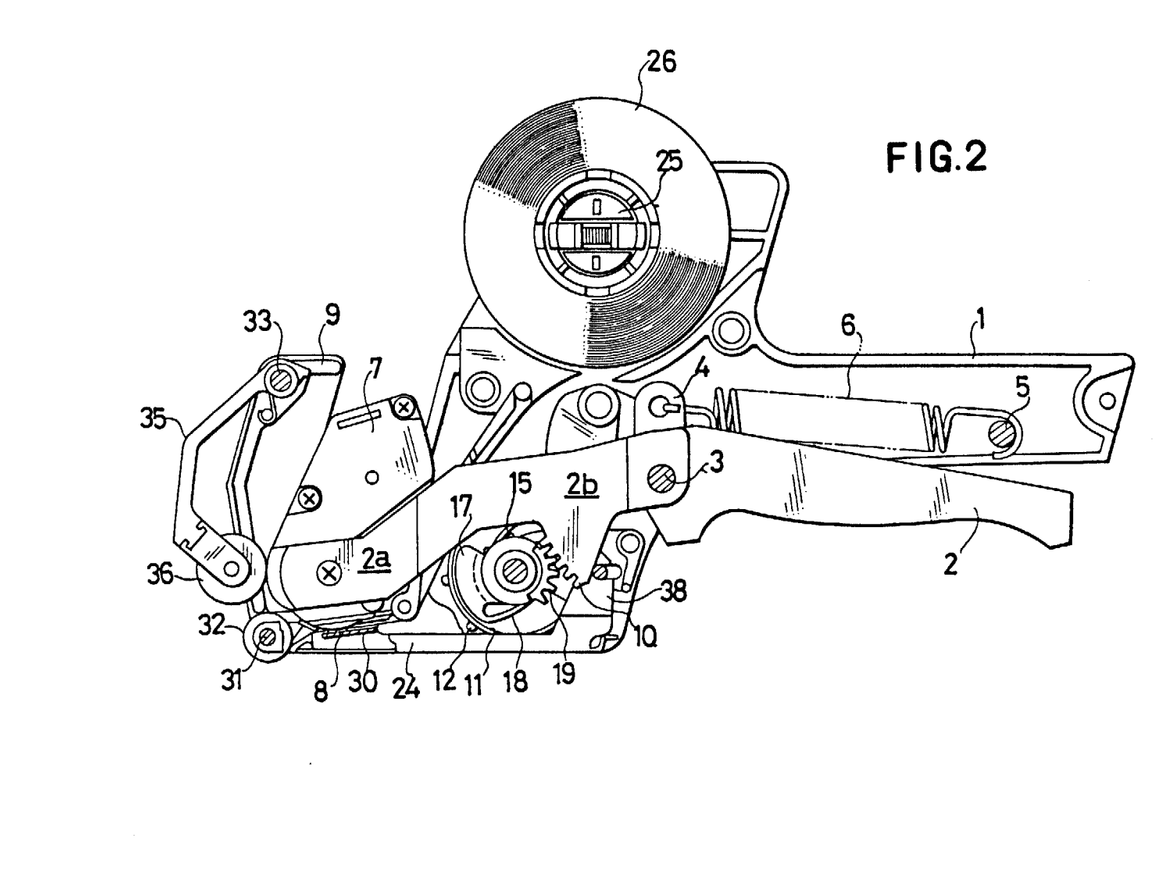
FIG. 2 is a view similar to FIG. 1, but showing the labeling machine in an imprinting position, with the hand lever gripped to its full stroke.

A portable labeling machine according to the present invention includes a frame 9 that has a rear portion that is formed into a hollow grip 1. A hand lever 2 is pivotally attached at a pivot shaft 3 to the labeling machine forwardly of the grip 1. One spring holding member 4 is formed integrally with the hand lever 2. Another spring holding member 5 is anchored in the rear portion of the grip 1. A tensioned, coiled return spring 6 extends between the two holding members 4 and 5 so as to bias the hand lever 2 to pivot to a stationary position apart from the grip 1, as shown in FIG. 1. The hand lever 2 is manually grippable toward the grip 1 against the bias of the spring 6 and into a gripped position, as shown in FIG. 2. Release of the gripping force permits the hand lever 2 to return to the stationary position of FIG. 1.

The pivotable hand lever 2 extends forward past the shaft 3, and forms a forwardly extending yoke, which is divided into a forward print portion 2a and a rearward drive portion 2b. The print portion 2a of the yoke supports a printing head 7 of any known kind, for instance, that of application Ser. No. 678,761, filed Apr. 21, 1976, now U.S. Pat. No. 4,018,157. The drive portion 2b of the yoke has a sector gear shaped drive gear 10 depending beneath it and located forward of and in the vicinity of the shaft 3.

Figure 3:
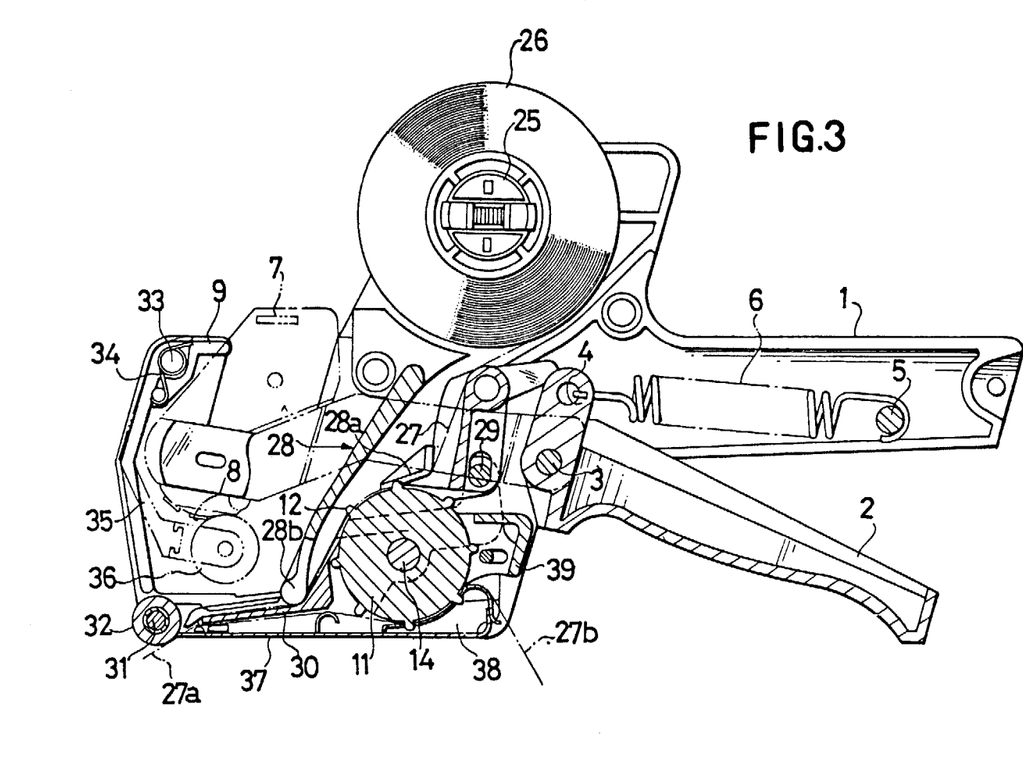
FIG. 3 is a longitudinal, side cross-sectional view showing the labeling machine in the stationary position of FIG. 1.
Figure 4:
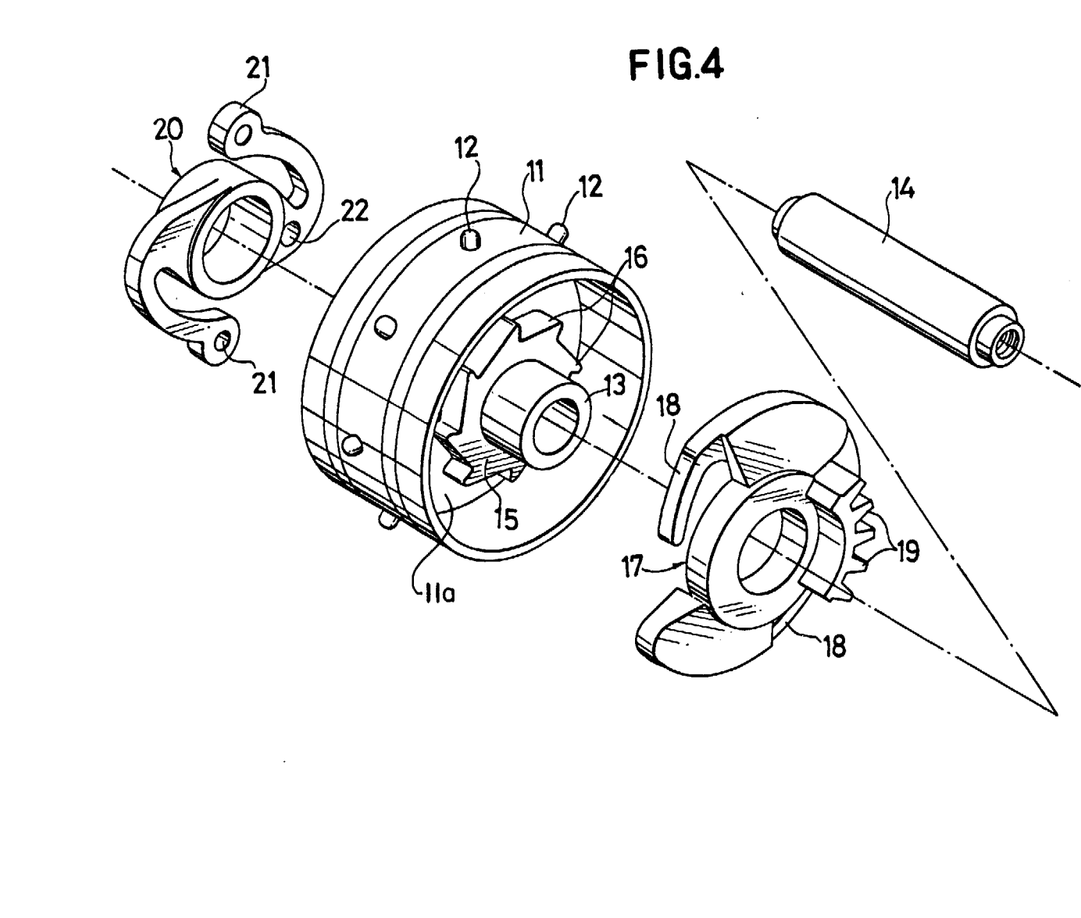
FIG. 4 is an exploded perspective view showing elements of the feed mechanism.

Turning to FIGS. 3 and 4, a feed wheel 11 is fitted rotatably on a main shaft 14 which is attached to and extends between a pair of side frames 9 of the labeling machine. The feed wheel 11 is driven by the drive portion 2b of the yoke so as to effect feeding of a continuous strip of labels 27. In FIG. 4, the feed wheel 11 has a plurality of feed projections 12 formed on its outer periphery and these projections are engageable with perforations (not shown) that are formed in the continuous label strip 27. The engagement enables reliable feeding of the label strip 27. The center of the feed wheel 11 has a disc 11a extending across it and this supports a cylindrical sleeve 13 which is rotatably fitted on the main shaft 14. The longitudinal portion of the cylindrical sleeve 13 that is inside wheel 11 near disc 11a and on one side of the disc is an integrally molded ratchet wheel 15 which has drivable teeth 16 on its periphery in the same number and spacing as the feed projections 12.

Rotatably fitted over the outer end portion of the cylindrical sleeve 13 near wheel 15 is a rotating pawl member 17. Member 17 is formed at diametrically opposite positions with a pair of ratchet pawls 18 having such shape and spacing that they can engage with two diametrically opposite drivable teeth 16 of the ratchet wheel 15. The pawls 18 are of a flexible, resilient plastic material such that when the pawls move clockwise in FIG. 4 with respect to wheel 11, the pawls slide past the teeth 16. At one side of the opening through the pawl member 17, there is a drivable gear 19, whose teeth are sized, arranged and placed to be in meshing engagement with the teeth of the sector gear 10.

Figure 6A:
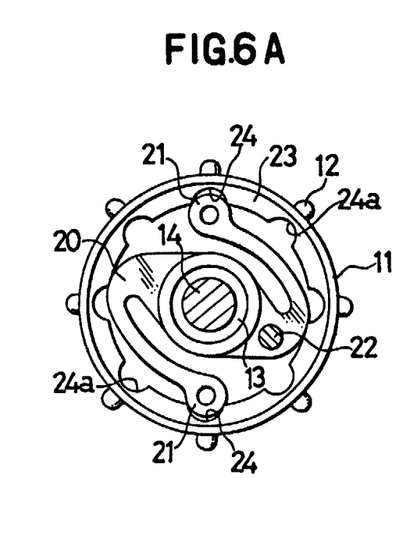
FIGS. 6a and 6b are also explanatory opposite side views showing the relationship between the retaining recesses formed in the feed wheel and the retaining projections of the non-return member.
Figure 6B:
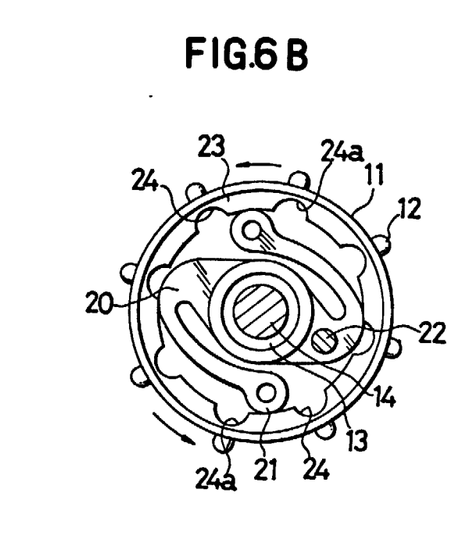

At the opposite end of the sleeve 13 from pawl member 17, and on the opposite side of disc 11a, a non-return member 20 is rotatably fitted on the cylindrical sleeve 13. The non-return member 20 has generally S-shape curved arms of flexible and resilient material extending to form enlarged, diametrically opposed, retaining projections 21 of generally arcuate cross-section. The projections are normally biased outwardly. The non-return member 20 is affixed to the machine frame 9 by a locking pin that passes through bore 22 into the frame 9. As seen in FIGS. 6a and 6b, the retaining projections 21 of the non-return member 20 are normally biased outwardly and removably into the retaining recesses 24, which are formed in the interior of the inner peripheral wall of an annular longitudinal sleeve-like end portion 23 of the feed wheel 11. The recesses 24 correspond in number and arcuate placement to the feed projections 12 of the feed wheel 11.

Referring to FIG. 3, there is a label threading device which threads the label strip 27 that is fed out from a rolled label strip 26 held on a label holder 25, past the feed wheel 11 to a platen 30. The threading device comprises a label guide 28 which is responsive to the motion of a shaft 29. Shaft 29 has an opening operating member (not shown) that is disposed outside of the machine frame. The label member 28 includes a first guide portion 28a, which presses the continuous label strip 27 against the outer periphery of the feed wheel 11. The guide includes a second guide portion 28b which presses the label strip 27 on to the platen 30. The platen 30 is secured by its end flanges (see FIG. 1) to the ends of the main shaft 14 of the feed wheel 11.

To thread the label strip 27, a bottom cover 37, which is hingedly supported on a support shaft 31 of the forward end of the frame 9, is opened around shaft 31, and the shaft 29 of the label guide member 28 is rotated clockwise in FIG. 3. Then, a passage or clearance for label strip threading is formed between the guide portions 28a and 28b, on the one hand, and the feed wheel 11 and the platen 30, on the other hand, respectively. After the label strip 27 has been threaded, the bottom cover 37 is pivoted closed. In the vicinity of the forward (left in FIG. 3) end of the platen 30, the label strip 27 is separated into a series of printed labels 27a and into a continuous strip of backing paper 27b to which the backs of the printed labels 27a had been adhered. To effect the separation, the backing paper strip 27b reverses in direction in the vicinity of the forward end of the platen 30 to engage with the feed projections 12 then on the underside of the feed wheel 11. The backing paper strip 27b is then fed out past a catch preventing member 39 toward the rear of the labeling machine. The printed labels 27a are fed out toward the front of the labeling machine by the guiding operation of an applying roller 32 so that the labels may be individually applied to a commodity or article.

There is an ink supply device for inking the printing surface 8 of the printing head 7. The device comprises an inking roller 36, which is impregnated with ink. Roller 36 is mounted to extend rearwardly of a roller arm 35. Roller arm 35 is supported upon a support shaft 33 which is pivotally attached to the machine frame 9. Roller arm 35 is normally biased by spring 34 toward the printing surface 8. Thus, the inking roller 36 rolls over the printing surface 8 in response to both gripping and releasing of the hand lever 2.

The operation of the labeling machine is now described. The labeling machine starts in the stationary position of FIG. 1. Gripping of the hand lever 2 shifts the labeling machine to the printing position of FIG. 2. The spring 6 returns the labeling machine to its original position when the hand lever 2 is released.

When the hand lever 2 is gripped, the forward extension 2a of the yoke is rotated counterclockwise in FIG. 1 about the shaft 3. The printing surface 8 of the printing head 7 presses down on the inking roller 36 and pivots the arm 35 clockwise in FIG. 1. The inking roller 36 rolls over and inks the printing surface 8. In the drive portion 2b of the yoke, on the other hand, the driven gear 19 of the rotating pawl member 17 is rotated clockwise by its meshing engagement with the sector gear 10.

Figure 5:
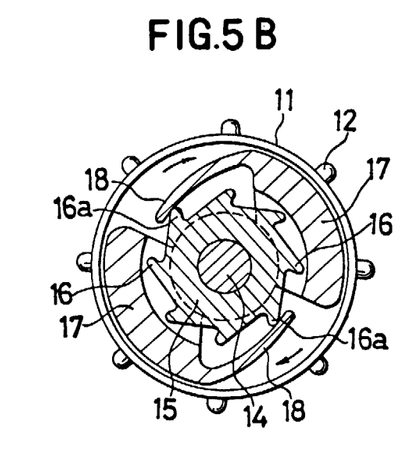
FIGS. 5a and 5b are explanatory side views showing the relationship between the ratchet wheel of the feed wheel and the paired ratchet pawls of the rotating pawl member.

By clockwise rotation in FIG. 5 of the pawl member 17, moreover, the flexible paired ratchet pawls 18 are shifted from the engaged condition of FIG. 5a, in which they are in driving engagement with the drivable teeth 16 of the ratchet wheel 15, to the override condition of FIG. 5b, at which they ride over the drivable teeth 16.

When the hand lever 2 is at its fully gripped position, that label 27a of the label strip 27 that is then on the platen 30 is stamped by the printing surface 8 of the printing head 7 to imprint the label. The pawl member 17 is being further rotated past the condition of FIG. 5b until the ratchet pawls 18 ride over the drivable teeth 16 of the ratchet wheel 15 and engage the clockwise subsequent teeth 16a.

When the hand lever 2 is released from its fully gripped condition, the print portion 2a and the drive portion 2b of the yoke are returned to their original stationary positions. The pawl member 17 is rotated counterclockwise through the driven gear 19 meshing with the sector gear 10. The ratchet wheel 15 is rotated counterclockwise from the condition past that shown in FIG. 5b, and in which its subsequent teeth 16a are in engagement with the ratchet pawls 18, to the condition of FIG. 5a. Thus, the feed wheel 11 is reliably intermittently rotated counterclockwise in FIG. 5 by the action of the ratchet wheel 15.

The non-return member 20 operates in synchronism with the intermittent rotation of the feed wheel 11. The non-return member 20 is at first in the retaining position of FIG. 6a, in which its paired retaining projections 21 are held in the retaining recesses 24 of the annular sleeve-like portion 23 of the feed wheel 11. Rotation of the feed wheel 11 by the pawl member 71 slides the member 20 along the inner peripheral wall of the annular portion 23, as shown in FIG. 6b, and into the next retaining position, at which the projections 21 are held in the subsequent recesses 24a. Rotation of the pawl member 17 in the reverse direction from the condition of FIG. 5a to that of FIG. 5b, is prevented by member 20. Thus, the desired non-return of feed wheel 11 can be effected after the feed wheel 11 has been rotated for one label length.

As has been described above, the rotatable pawl member is removably engageable with the ratchet wheel, and both of these are disposed at one end of the feed wheel. The pawl member is coaxial with the feed wheel and with the ratchet wheel. The pawl member is comprised of a pair of flexible ratchet engaging pawls and a drivable gear. Thus, the transmission of driving force by the pawl member can be accomplished reliably and safely and the construction is strong so as to be free from breakage even under the application of an abrupt load, which often occurs with other manually operated portable labeling machine.

The non-return member is removably engageable with retaining recesses formed at the other end of the feed wheel. The non-return member is coaxial with the feed wheel. The non-return member is comprised integrally of a pair of flexible retaining projections. Thus, the feed wheel can be reliably prevented from undesirable reverse rotation.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A portable labeling machine, comprising:
   a machine body; a passageway for a strip of labels in said body; a feed mechanism for feeding labels along said passageway; an actuating lever movable to operate said labeling machine and said feed mechanism;
   said feed mechanism comprising:
   a feed wheel rotatably mounted in said machine body; label strip engaging elements on said feed wheel and movable along said passageway as said feed wheel rotates for engaging and advancing a label strip; said feed wheel having one longitudinal end; a portion of said feed wheel comprising a sleeve-like element extending coaxially thereof; said sleeve-like element having an interior surface and said feed wheel having additional recesses defined in the interior surface thereof; said recesses being spaced apart the angular distance of rotation of said feed wheel required to move said feed wheel the length of one label;
   a ratchet wheel coaxial with said feed wheel and connected thereto to rotate therewith;
   a pawl member coaxial with and rotatable with respect to said ratchet wheel; said pawl member including a pawl engageable with said ratchet wheel for rotating said ratchet wheel in one direction as said pawl member rotates in said one direction and for not rotating said ratchet wheel as said pawl member rotates in the opposite direction;
   said actuating lever being connected to said pawl member for rotating said pawl member in said one direction and said opposite direction as said actuating lever is moved;
   non-return means connected to said feed wheel for blocking rotation thereof in said opposite direction as said pawl member moves in said opposite direction; said non-return means comprises a support secured to said machine body; a pair of flexible, resilient arms extending from said support at diametrically opposed positions around said support and coaxially of said feed wheel; said non-return means arms and their said support being located inside said sleeve-like element and being biased outwardly into said recesses in said interior surface thereof; said arms being of such length and placement and said recesses being so placed that both said arms simultaneously engage in a respective said recess; each said non-return means arm being curvedly shaped and being oriented on and extending from said support such that from the engagement of one said arm of said pair thereof with a said feed wheel recess to the engagement of the other said arm of said pair thereof with a second said feed wheel recess, said non-return means having a generally S-shape.

2. The portable labeling machine of claim 1, wherein said pawl is flexible and is resiliently biased into engagement with said ratchet wheel.

3. The portable labeling machine of claim 1, wherein said ratchet wheel has ratchet teeth thereon; said pawl being engageable with said ratchet teeth;
   said feed wheel having said one longitudinal end and an opposite longitudinal end which are coaxial with said feed wheel; said ratchet wheel being located nearer said opposite longitudinal end of said feed wheel; said non-return means being located nearer said one longitudinal end of said feed wheel.

4. The portable labeling machine of claim 1, wherein said pawl member includes a drivable gear means thereon and said actuating lever includes a driving gear means thereon and in engagement with said drivable gear means such that movement of said actuating lever moves said pawl member.

5. The portable labeling machine of claim 4, wherein said actuating lever is pivotally attached to said labeling machine body and said driving gear means is spaced away from said pivot connection between said actuating lever and said body, whereby said driving gear means is moved by pivoting of said actuating lever.

6. The portable labeling machine of claim 1, wherein said ratchet wheel has ratchet teeth thereon; said pawl being engageable with said ratchet teeth.

7. The portable labeling machine of claim 6, wherein said pawl member includes a drivable gear means thereon and said actuating lever includes a driving gear means thereon and in engagement with said drivable gear means such that movement of said actuating lever moves said pawl member.

8. The portable labeling machine of claim 6, wherein said ratchet teeth are spaced apart a distance of rotation of said feed wheel to move said feed wheel the length of one label.

9. The portable labeling machine of claim 6, wherein said pawl is flexible and resilient and biased into engagement with said ratchet teeth.

10. The portable labeling machine of claim 9, wherein there are two said pawls on said pawl member located at diametrically opposed positions around said pawl member.

11. The portable labeling machine of claim 9, wherein said pawl member includes a drivable gear means thereon and said actuating lever includes a driving gear means thereon and in engagement with said drivable gear means such that movement of said actuating lever moves said pawl member.

12. The portable labeling machine of claim 1, further comprising means for supplying a label strip to be fed by said feed mechanism.

13. The portable labeling machine of claim 12, further comprising means for imprinting a label located in said passageway; said imprinting means being connected with said actuating lever to be operated by movement of said actuating lever;

means for applying a label that has been imprinted to an object positioned to receive the imprinted label.

14. The portable labeling machine of claim 1, wherein said arms engage respective said feed wheel recesses at respective outer ends of said arms which are away from said support; each said arm outer ends being arcuately curved in shape, whereby said outer ends may easily move into and out of each said recess in turn.

* * * * *